United States Patent
Ishihara

(10) Patent No.: US 7,906,562 B2
(45) Date of Patent: Mar. 15, 2011

(54) EPOXY RESIN, EPOXY RESIN COMPOSITION CONTAINING THE EPOXY RESIN AS AN ESSENTIAL COMPONENT AND A CURED PRODUCT CONTAINING THE EPOXY RESIN AS AN ESSENTIAL COMPONENT

(75) Inventor: Kazuo Ishihara, Chiba (JP)

(73) Assignee: Nippon Steel Chemicals Co., Ltd., Tokyo (JP)

( * ) Notice: Subject to any disclaimer, the term of this patent is extended or adjusted under 35 U.S.C. 154(b) by 0 days.

(21) Appl. No.: 12/223,793

(22) PCT Filed: Dec. 21, 2007

(86) PCT No.: PCT/JP2007/075346
§ 371 (c)(1),
(2), (4) Date: Aug. 6, 2008

(87) PCT Pub. No.: WO2008/081958
PCT Pub. Date: Jul. 10, 2008

(65) Prior Publication Data
US 2010/0168268 A1    Jul. 1, 2010

(30) Foreign Application Priority Data
Dec. 28, 2006  (JP) ................... 2006-353732

(51) Int. Cl.
C08G 59/00   (2006.01)
C08G 59/14   (2006.01)
C08G 65/04   (2006.01)

(52) U.S. Cl. ........ 522/170; 528/403; 528/406; 528/418; 528/421; 525/523

(58) Field of Classification Search ............. 522/25, 522/31, 170; 528/403, 406, 418, 419, 421; 525/523
See application file for complete search history.

(56) References Cited

U.S. PATENT DOCUMENTS

| | | | | |
|---|---|---|---|---|
| 4,284,574 A | * | 8/1981 | Bagga ............ | 549/555 |
| 4,818,776 A | * | 4/1989 | Koleske .......... | 522/31 |
| 4,824,927 A | * | 4/1989 | Dobbelstein et al. ........ | 528/88 |
| 4,874,798 A | * | 10/1989 | Koleske et al. ............ | 522/31 |
| 4,952,645 A | * | 8/1990 | Mulhaupt et al. .......... | 525/438 |
| 6,417,243 B1 | * | 7/2002 | Peeters et al. ............ | 522/31 |
| 6,451,929 B1 | * | 9/2002 | Smits et al. .............. | 525/448 |

FOREIGN PATENT DOCUMENTS

JP     10-130367    *   5/1998

OTHER PUBLICATIONS

Machine Translation from PAJ website of JP 10-130367, Abstract and pp. 1-10, May 19, 1998.*

* cited by examiner

*Primary Examiner* — Susan W Berman
(74) *Attorney, Agent, or Firm* — Flynn, Thiel, Boutell & Tanis, P.C.

(57) ABSTRACT

An epoxy resin possessing one or more primary hydroxyl groups and one or more epoxy groups in one molecule is useful in a photo-curing method.

general formula

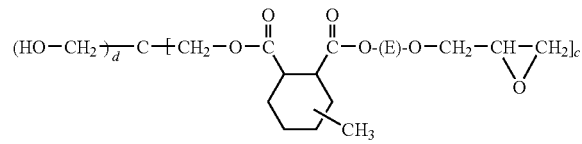

11 Claims, 6 Drawing Sheets

EPOXY RESIN, EPOXY RESIN COMPOSITION CONTAINING THE EPOXY RESIN AS AN ESSENTIAL COMPONENT AND A CURED PRODUCT CONTAINING THE EPOXY RESIN AS AN ESSENTIAL COMPONENT

FIELD OF THE INVENTION

The present invention relates to an epoxy resin which is useful for photo-curing, an epoxy resin composition and an epoxy resin cured product, in particular an epoxy resin, an epoxy resin compound and an epoxy resin cured product of the present invention are useful for a paint, an adherent, a photo art, a sealing agent, a molding agent and a material for an electric or electronic photo circuit.

DESCRIPTION OF THE PRIOR ART

In general, an epoxy resin is widely used for electronic parts, electric machine and tools, car parts, FRP or sport supplies because of excellent adhesive property, heat resistance and molding ability. A cured product of an epoxy resin can be obtained by heating an epoxy resin using a curing agent. As a curing agent to be used, amine curing agents or acid anhydride agents can be mentioned. However, the term for using an epoxy resin composition that uses these curing agents is limited because curing reaction progresses gradually at room temperature and the viscosity becomes thicker.

By a photo-curing method which cures an epoxy resin using a photo-polymerization initiator, an epoxy resin composition having a better preservation stability than using said amine agents or photo-polymerization initiator can be obtained, because a curing reaction does not occur as long as photo energy is not irradiated thereon.

A photo-curing method of an epoxy resin is characterized in blending a photo-polymerization initiator and a composition which provides pliability and improves reacting ability by blending polyols in general (not patent document 1). Since the reacting speed of an epoxy group of an epoxy resin with a primary hydroxyl group of polyols is faster than the reaction speed of epoxy groups with each other, the reacting ability is improved (not patent document 2). However, if the molecular weight of the blended polyols is low, a problem of volatilization during the curing process or a problem of unsaturated curing by moisture absorption are pointed out. Further, when the molecular weight of the blended polyols is high, a problem of deterioration in heat resistance caused by a decrease in crosslinking density is caused.

Not patent document 1: The Dow Chemical Company "CYRACURE Cycloaliphatic Epoxides Cationic UV Cure"

Not patent document 2: "Hikari Oyo Gijyutsu•Zairyo Jiten"

OBJECT OF THE INVENTION

The inventors of the present invention investigated an epoxy resin that is useful to a photo-curing method, and have found out that a new epoxy resin possessing one or more primary hydroxyl groups and one or more epoxy groups in one molecule represented by a specific formula can provide an epoxy resin composition or epoxy resin-cured product not only whose reacting ability is improved and pliability is provided, but also the problems of volatilization, higher moisture absorption and lower heat resistance, which are pointed out in conventional polyols-blended epoxy resin compositions or epoxy resin cured products, are eliminated, and accomplished by the present invention. The object of the present invention is to provide an epoxy resin, an epoxy resin composition and an epoxy resin cured product which can eliminate the problems that conventional epoxy resins, epoxy resin compositions and epoxy resin cured products have, that is, the problems of volatilization, moisture absorption and heat resistance caused by blending polyols.

The above-mentioned object is accomplished by using a new epoxy resin represented by formula 1 possessing one or more primary hydroxyl groups and one or more epoxy groups in one molecule.

formula 1

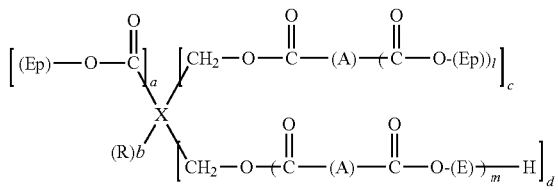

a is 0 or an integer of 1 or more,
b is 0 or an integer of 1 or more,
c is 0 or an integer of 1 or more,
d is an integer of 1 or more,
wherein a+c is an integer of 1 or more,
l is an integer of 1 or more,
m is 0 or 1,
(Ep) is a reaction residue of an epoxy resin and is specifically represented by formulae 2 and 3.
(E) is a reaction residue of epoxy resin and is specifically represented by formulae 4 and 5.
(X) is a carbon atom or a hydrocarbon group which can contain a nitrogen atom, phosphorus atom, oxygen atom or sulfur atom.
(A) is a hydrocarbon group of an acid anhydride residue and can contain a nitrogen atom, phosphorus atom, oxygen atom or sulfur atom.
R is a hydrogen atom or a hydrocarbon group which can contain a nitrogen atom, phosphorus atom, oxygen atom or sulfur atom.

formula 2

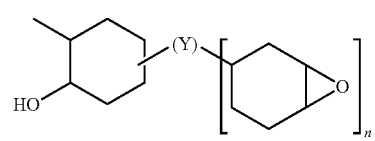

n is an integer of 1 or more,
Y is a hydrocarbon group and can contain a nitrogen atom, phosphorus atom, oxygen atom or sulfur atom and, further, can have a linear, branch ring, aromatic ring or heterocyclic structure.

formula 3

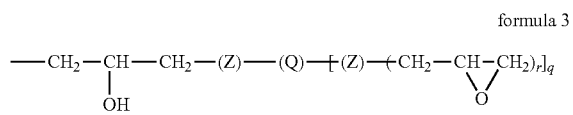

q is an integer of 1 or more,
r is 1 or 2,
Q is a hydrocarbon group and can contain a nitrogen atom, phosphorus atom, oxygen atom or sulfur atom and, further, can have a linear, branch, ring, aromatic ring or heterocyclic structure.

Z indicates —O—, —COO—, —N=

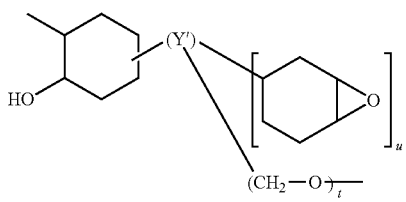

formula 4 u is 0 or an integer of 1 or more,
t is an integer of 1 or more,
Y' is a hydrocarbon group and can contain a nitrogen atom, phosphorus atom, oxygen atom or sulfur atom, and further can have a linear, branch, ring, aromatic ring or heterocyclic structure.

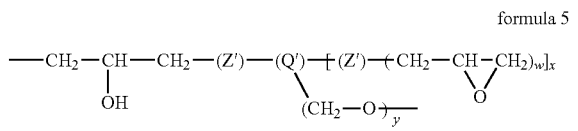

formula 5 w is 1 or 2,
x is 0 or an integer of 1 or more,
y is an integer of 1 or more,
Q' is a hydrocarbon group and can contain a nitrogen atom, phosphorus atom, oxygen atom or sulfur atom, and further can have a linear, branch, ring, aromatic ring or heterocyclic structure.
Z' indicates —O—, —COO—, —N=.

BRIEF ILLUSTRATION OF DRAWINGS

DETAILED DESCRIPTION OF THE INVENTION

Figure 1:
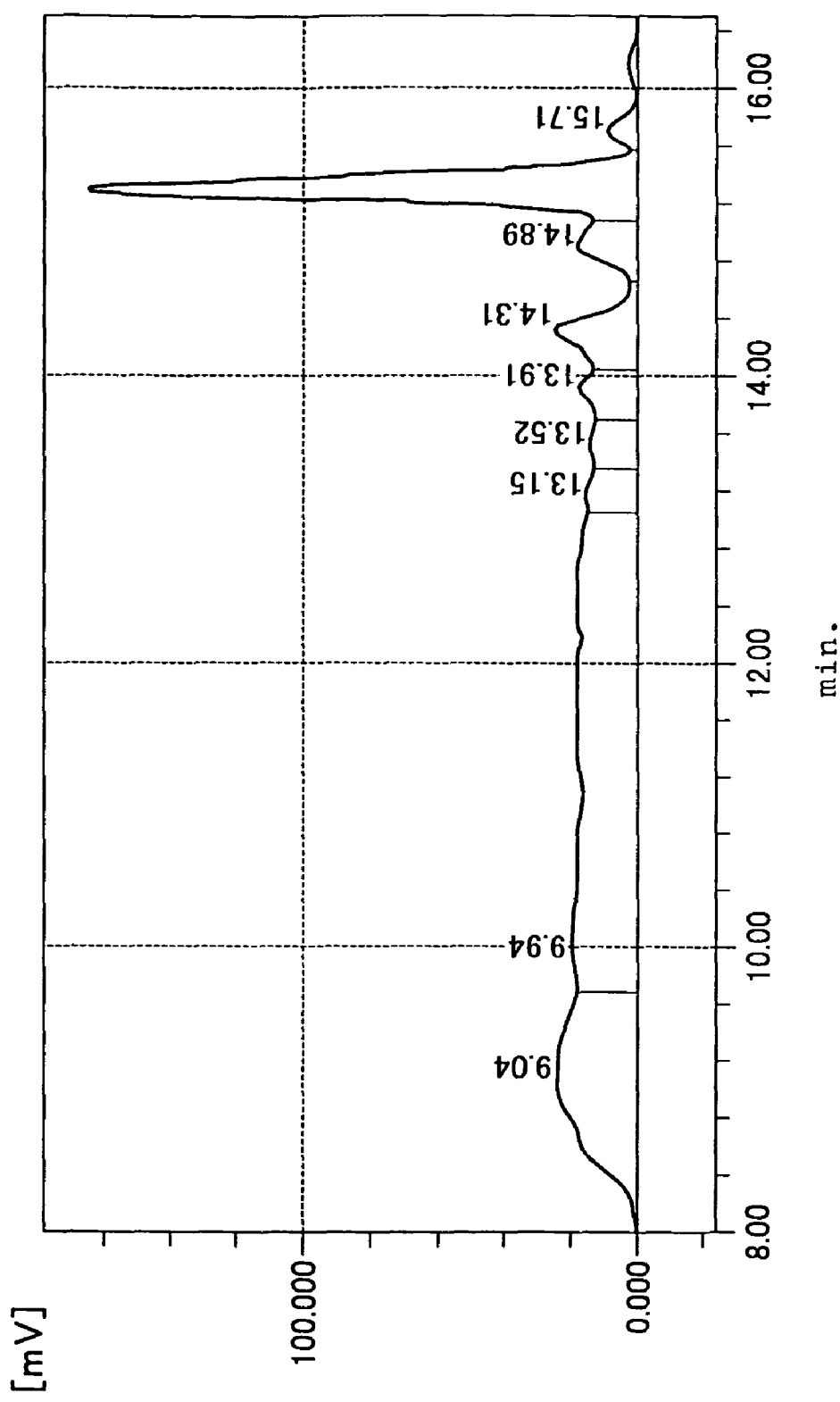
FIG. 1 shows the molecular weight distribution by GPC of the epoxy resin obtained in Example 1.

Details of the present invention will be illustrated as follows.

The epoxy resin of the present invention is represented by formula 1, which possesses one or more than one primary hydroxyl group and one or more than one epoxy group in one molecule.

As one method of preparing the epoxy resin of the present invention, a method of reacting all the carboxyl groups of a compound which has one or more primary hydroxyl groups and one or more carboxylic acid groups in one molecule with an epoxy group is proposed.

As a specific example of the compound which has one or more primary hydroxyl groups and one or more carboxylic acid groups in one molecule, glycolic acid, dimethylolpropionic acid or dimethylolbutanoic acid can be mentioned. Further, said compound can be obtained by reacting alcohols possessing 2 or more primary hydroxyl groups in one molecule with carboxylic acids and/or acid anhydrides thereof, however, it is not limited to these compounds and can be obtained by mixing 2 or more of these compounds.

As an epoxy resin which reacts with the compound which has one or more primary hydroxyl group and one or more carboxylic acid groups in one molecule, a publicly known epoxy resin can be used and, specifically, BPA epoxy resins of Tohto Kasei Co., Ltd., such as EPOTOHTO YD-128, EPOTOHTO YD-8125, EPOTOHTO YD-127, EPOTOHTO YD-825GS, EPOTOHTO YD-134, EPOTOHTO YD-011, EPOTOHTO YD-012, EPOTOHTO YD-013, EPOTOHTO YD-901, EPOTOHTO YD-902 or EPOTOHTO YD-903, BPF epoxy resins such as EPOTOHTO YDF-170, EPOTOHTO YDF-8170, EPOTOHTO YDF-870GS, EPOTOHTO YDF-2001 or EPOTOHTO YDF-2004, novolac epoxy resins such as EPOTOHTO YDPN-638, EPOTOHTO YDCN-701, EPOTOHTO YDCN-702 or EPOTOHTO YDCN-703, aralkyl novolac epoxy resins such as ESN-175, ESN-375 or ESN 485, amine epoxy resins such as EPOTOHTO YH-434 or YH-434L, glycydyl ester epoxy resins such as EPOTOHTO YD-171 or YD-172, aliphatic epoxy resins such as EPOTOHTO YH-300, EPOTOHTO ZX-1542, EPOTOHTO PG-207 or EPOTOHTO PG-207GS, alicyclic epoxy resin such as EPOTOHTO ST-3000 or EPOTOHTO ZX-1658, EPOTOHTO ZX-1658GS, EPOTOHTO ZX-1715, HBPA-DGE, DCPD-EP or TCPD-EP which are products of Maruzen Petrochemical Co., Ltd., YX8000 or YX8034 which are products of Japan Epoxy Resin Co., Ltd., CELLOXIDE 2021, CELLOXIDE 2021A, CELLOXIDE 2021P or CELLOXIDE 3000 of Daicel Chemical Industries, Ltd. or a hydrogenated dimer acid epoxy resin can be mentioned, however, it is not limited to these compounds and can be used in combinations thereof.

The reaction is carried out by blending more than 1.1 mol, desirably, more than 2.0 mol, more desirably, more than 3.0 mol of epoxy group to 1.0 mol of carboxyl group.

The reaction between the compound which has one or more primary hydroxyl groups and one or more epoxy groups in one molecule and an epoxy resin can be carried out by publicly known methods for synthesis. That is, the reaction can be carried out by blending the compound which has one or more primary hydroxyl groups and one or more carboxylic acid groups in one molecule and the epoxy resin and heating. An inactive solvent or catalyst can be used, if necessary. The reaction temperature is from 50° C. to 200° C., desirably from 80° C. to 180° C. The end point of the reaction can be determined by confirming the disappearance of carboxyl groups by instrumental analysis or by confirming the degree of acid by chemical analysis. The reaction time is from 1 to 6 hours.

As a usable inactive solvent, a solvent that does not have a hydroxyl group is desirable and, specifically, benzene, toluene or xylene can be mentioned, however, the solvent is not limited to these solvents and can be used in combinations thereof.

As a usable catalyst, imidazoles such as 2-methylimidazol or 2-ethyl-4-methylimidazol, phosphines such as triphenyl phosphine, tritolyl phosphine, tris(2,6-dimethoxyphenyl) phosphine or phosphonium salts such as tetrabutylphosphoniumbromide, tetrabutylphosphoniumiodide, ethyltriphenylphosphoniumbromide or ethyltriphenylphosphoniumiodide can be mentioned, however, the catalyst is not limited to these catalysts and can be used in combinations thereof.

The compound which has one or more primary hydroxyl groups and one or more epoxy groups in one molecule can be also obtained by reacting alcohols having two or more primary hydroxyl groups in one molecule with a carboxylic acid and/or acid anhydride.

In the reaction, the compound which has one or more primary hydroxyl groups and one or more epoxy groups in one molecule can be obtained by carrying out the reaction with the acid anhydride equivalent to 1 equivalent of primary hydroxyl group to be smaller than 1 equivalent. If the reaction is carried out with 1 equivalent of acid anhydride to 1 equivalent of primary hydroxyl group, the epoxy resin of this invention cannot be obtained because the primary hydroxyl group does not remain. Further, if the equivalent of acid anhydride to 1 equivalent of primary hydroxyl group is larger than 1 equivalent, there is the possibility of gelation during the reaction with epoxy resins because the acid anhydride remains. The desirable equivalent of acid anhydride is smaller than 1 and more than 0.5 equivalent. By adjusting the equivalent of the primary hydroxyl group and the equivalent of the acid anhydride, the primary hydroxyl groups can be adjusted voluntarily.

As an alcohol having two or more primary hydroxyl groups in one molecule, divalent alcohols such as ethylene glycol, diethylene glycol, propylene glycol, dipropylene glycol, 1,4-butanediol, neopentylglycol, 1,6-hexanediol, 1,8-octanediol, cyclohexanedimethanol or spiroglycol, trivalent alcohols such as glycerin, trimethylolethane, trimethylolpropane or hexanetriol, polyvalent alcohols such as sorbitol, sucrose, pentaerythritol, ditrimethoxylolethane, ditrimethylolpropane or dipentaerythritol, an alkyleneoxide adduct of these alcohols can be mentioned, however, the alcohol is not limited to these compounds, and these compounds can be used in combinations thereof.

As an acid anhydride, itaconic acid anhydride, citraconic acid anhydride, 2-carboxy-ethyl-methyl-phosphinic acid anhydride, phthalic acid anhydride, hexahydrophthalic acid anhydride, tetrahydrophthalic acid anhydride, methylhexahydrophthalic acid anhydride, methyltetrahydrophthalic acid anhydride, methylnadic acid anhydride, dodecylsuccinic acid anhydride, pyromellitic acid anhydride, benzophenonetetracarboxylic acid anhydride, ethyleneglycolbis(anhydrotrimellitic) acid anhydride, methylcyclohexene tetracarboxylic acid anhydride, trimellitic acid anhydride, naphthalic acid anhydride or an acid anhydride disclosed in JP H6-80765 publication can be mentioned, however, the acid anhydride is not limited to these compounds, and these compounds can be used in combinations thereof.

The reaction of the alcohol with the carboxylic acid anhydride can be progressed by blending the prescribed amount and heating. In the reaction, an inactivated solvent or catalyst can be used, if necessary. The reaction temperature is from 50° C. to 180° C., desirably from 80° C. to 150° C. The end point of the reaction can be decided by confirming the disappearance of the acid anhydride by an instrumental analysis or by confirming the degree of acid by chemical analysis. The reaction time is from 1 to 6 hours.

As an inactivated solvent which can be used in the reaction, it is necessary that the reacted product can be dissolved and, specifically, benzene, toluene, xylene or methylisobutylketone can be mentioned. However, the solvent is not limited to these compounds, and these compounds can be used in combinations thereof.

By reacting a compound possessing two or more carboxyl groups in one molecule with epoxy resins possessing one or more primary hydroxyl groups and two or more epoxy groups in one molecule, an epoxy resin which has one or more primary hydroxyl groups and one or more epoxy groups in one molecule can be synthesized too.

As a compound possessing two or more carboxyl groups in one molecule, oxalic acid, malonic acid, fumaric acid, succinic acid, glutaric acid, adipic acid, phthalic acid, maleic acid, sebacic acid, itaconic acid, citraconic acid, cyclohexanetricarboxylic acid or naphthalene dicarboxylic acid can be mentioned. Further, the compound which has more than two carboxyl groups in one molecule can be also synthesized by reacting the aforementioned alcohols possessing two or more primary hydroxyl groups in one molecule with the carboxylic acid-containing acid anhydride. In the reaction, the primary hydroxyl group can remain.

An epoxy resin possessing one or more primary hydroxyl groups in one molecule can be obtained by adjusting the amount of alkali, the amount of catalyst, reaction temperature or reaction time so as to add an epoxy group remaining primary hydroxyl group at the epoxidation of a compound possessing two or more primary hydroxyl groups.

A compound possessing two or more carboxyl groups in one molecule and an epoxy resin possessing one or more primary hydroxyl groups and two or more epoxy groups in one molecule can be reacted by publicly known methods, that is, by blending prescribed amounts of these two compounds and heating. In the reaction, an inactivated solvent or catalyst can be used, if necessary. The reaction temperature is from 50° C. to 200° C., desirably from 80° C. to 180° C. The end point of the reaction can be determined by confirming the disappearance of the carboxyl groups by an instrumental analysis or by confirming the degree of acid by chemical analysis. The reaction time is from 1 to 6 hours.

The epoxy resin composition of the present invention is adjusted to have an equivalent ratio of epoxy group to 1 equivalent of primary hydroxyl group to be within the 5 to 50 range by blending the new epoxy resin of the present invention and/or another epoxy resin. By this adjustment, the high-reacting ability and excellent heat resistance of the cured product are accomplished.

If the equivalent ratio of epoxy resin to equivalent of primary hydroxyl group is smaller than 5 or more than 50, the heat resistance deteriorates.

As a curing agent suitable for an epoxy resin composition of the present invention, a photo-polymerization initiator can be mentioned. As a specific example of a photo-polymerization initiator, onium salts such as Lewis acids, Bronsted acids, sulfonium salts, iodoniums salt or diazoniums salt can be mentioned. Among these compounds, a sulfonium salt is desirable, and among sulfonium salts, an aromatic sulfonium salt is more desirable. Specifically, SANAIDO SI-60L, SANAIDO SI-80L or SANAIDO SI-100L (products of Sanshin Chemical Industry Co., Ltd.), ADEKA OPTOMER-SP-150 or ADEKA OPTOMER-SP-170 (products of Adeka Industries Co., Ltd.), CI-5102 (product of Nippon Soda Co., Ltd.), CYRACURE UV1-6976 or CYRACURE UV1-6992 (products of The Dow Chemical Co., Ltd.) can be mentioned. However, the curing agent is not limited to these compounds, and these compounds can be used in combinations thereof.

Although the blending amount of said photo-polymerization initiator differs according to the light irradiation condition, the kind of epoxy resin and amount thereof, the kind of photo-polymerization initiator or thickness and shape of the cured product, from 0.01 weight parts to 10 weight parts to 100 weight parts of epoxy resin.

The epoxy resin composition of the present invention can be blended with a sensitizer, anti-aging agent, stabilizer, plasticizer, wax, leveling agent, filler, pigment dye, flame retardant, foaming agent, antistatic agent, anti-mildew agent, viscosity-controlling agent or solvents can be blended besides the photo-polymerization initiator. Further, an epoxy resin besides the epoxy resin of the present invention can be blended in a range not to spoil the effect of the present invention.

The epoxy resin cured product of the present invention can be obtained by photo-irradiation and/or heating of the epoxy resin composition of the present invention.

As the light to irradiate during the curing process of the epoxy resin composition of the present invention, any kind of light which can cure with the photo-polymerization initiator can be used according to the kind of photo-polymerization initiator.

When UV light is used as the above-mentioned light, the light source is not restricted and, for example, an ordinary UV light irradiation source such as fluorescent lamp or high pressure mercury lamp can be used. Further, as a light source, low pressure mercury lamp, xenon lamp, metal halide lamp, sterilization lamp, laser light or LE light can be used.

Although illuminance, irradiation amount and irradiation time of said light differs according to the kind and amount of the photo-polymerization initiator, and epoxy resin backbone of the present invention, adducts and thickness, they can be voluntarily adjusted according to the physical properties of the cured product.

As carried out ordinarily in a photo-curing method, heat-curing can be carried out before and after photo-irradiation, and the curing can be more progressed.

By the use of the epoxy resin composition obtained by the photo-polymerization method in which the new epoxy resin of the present invention is contained as an essential ingredient, an epoxy resin composition and epoxy resin cured product that solves the problems of volatilization, high moisture absorption or low heat-resistance, which was the problem of conventional epoxy resin compositions and epoxy resin cured products, can be obtained.

EXAMPLES

The present invention will now be illustrated more in detail according to the Examples, however, it is not intended to limit the scope of claims of the present invention to the Examples.

Example 1

Figure 2:
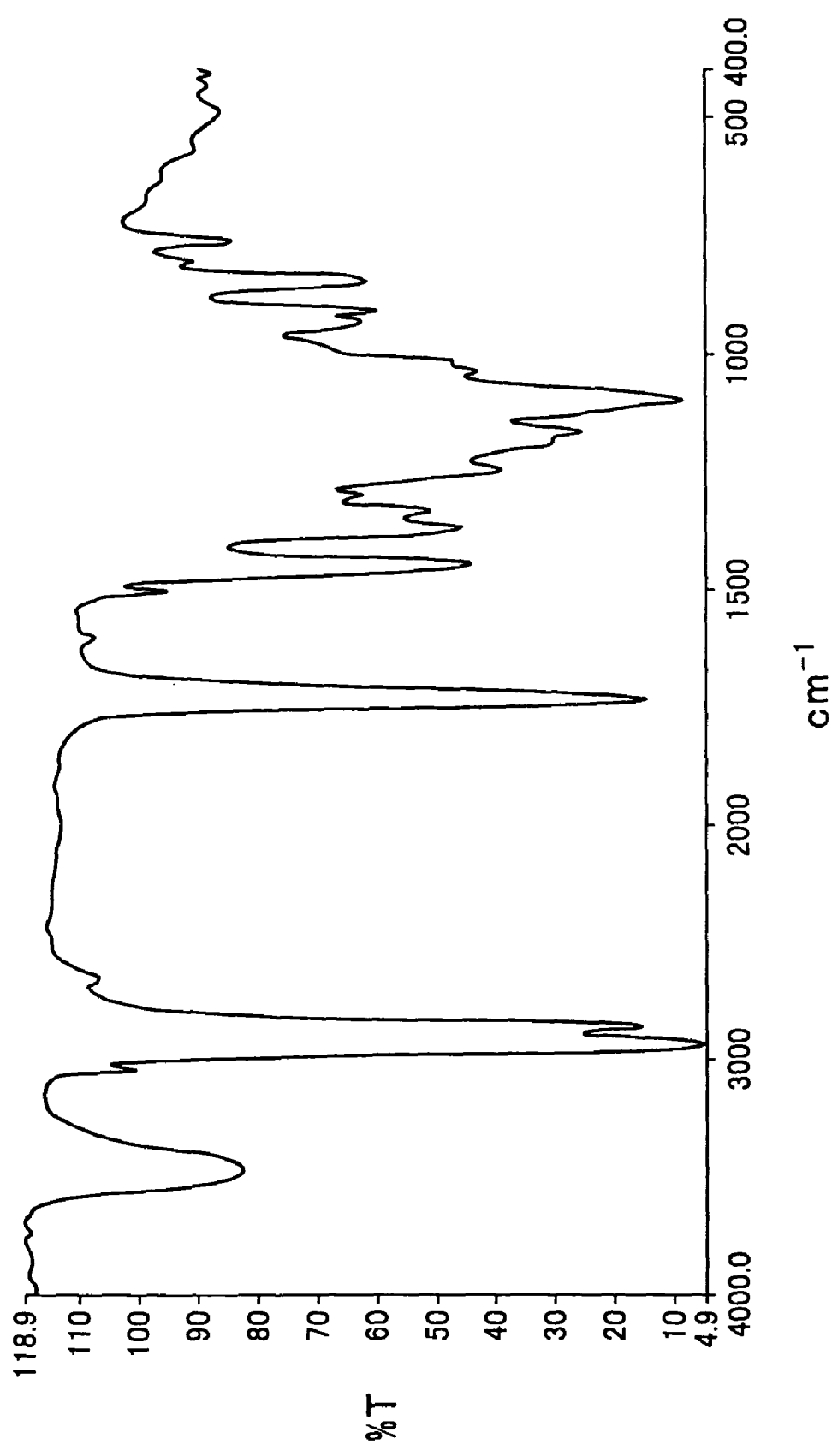
FIG. 2 shows the measuring results of FTIR of the epoxy resin obtained in Example 1.

34.0 parts of pentaerythritol (number-averaged number of functional groups in one molecule; 4, product of Mithubishi Gas Chemicals Company, INC.), 134.3 parts of RIKACID MH-700 (methylhexahydrophthalic acid anhydride, product of New Japan Chemical Co., Ltd.) and 30.0 parts of toluene are poured into a separable flask with a condenser, and heated with stirring in a nitrogen gas atmosphere. The acid anhydride group to primary hydroxyl group was 0.799. The reaction was carried out at 130° C. and it was confirmed that the acid anhydride had vanished. Then, 617.4 parts of HBPA-DGE (hydrogenated BPA epoxy resin, product of Maruzen Petrochemical Co., Ltd.,) was added, heated and homogenized. As a catalyst, 0.1 parts of TPP-BB (n-butyltriphenyl-phosphoniumbromide, product of Hokko Chemical Industry Co., Ltd.) was dissolved in acetone and added. The reaction was carried out at 150° C. and the reaction was stopped by confirming that the acid number became zero. The epoxy equivalent of the obtained epoxy resin was 420.8 g/eq and equivalent of primary hydroxyl group was 3261 g/eq. The molar ratio of the epoxy group and primary hydroxyl group was 9.31. The molecular weight distribution by GPC is shown in FIG. 1 and measuring result of FTIR is shown in FIG. 2.

Example 2

The same process as Example 1 was carried out except for changing the parts of RIKACID MH-700 to 151.0 parts and parts of HBPA-DGE to 753.1 parts. The acid anhydride group to primary hydroxyl group ratio was 0.899. The epoxy equivalent of the obtained epoxy resin was 381.9 g/eq and equivalent of primary hydroxyl group was 2160 g/eq. The molar ratio of the epoxy group and primary hydroxyl group was 24.28.

Example 3

The same process as Example 1 was carried out except for changing the parts of RIKACID MH-700 to 159.6 parts of HBPA-DGE to 667.0 parts. The acid anhydride group to primary hydroxyl group ratio was 0.950. The epoxy equivalent of the obtained epoxy resin was 408.9 g/eq and equivalent of primary hydroxyl group was 17212 g/eq. The molar ratio of the epoxy group and primary hydroxyl group was 42.09.

Example 4

The same process as Example 1 was carried out except for changing the parts of RIKACID MH-700 to 100.7 parts and changing the epoxy resin to 280.0 parts of HBPA-DGE and 280.0 parts of CELLOXIDE 2021. The acid anhydride group to primary hydroxyl group ratio was 0.599. The epoxy equivalent of the obtained epoxy resin was 273.5 g/eq and equivalent of primary hydroxyl group was 1734 g/eq. The molar ratio of epoxy group and primary hydroxyl group was 6.34.

Example 5

Figure 3:
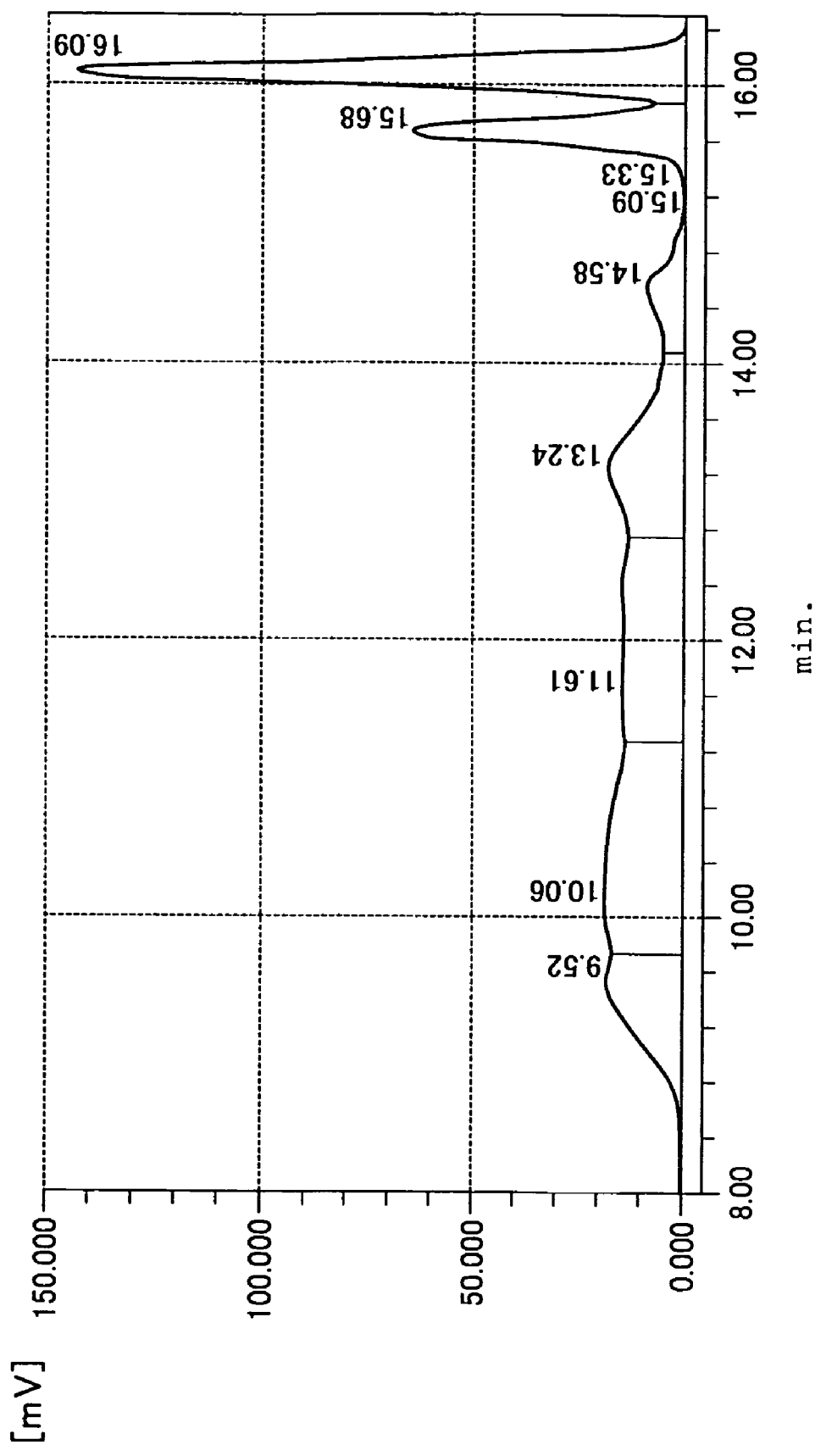
FIG. 3 shows the molecular weight distribution by GPC of the epoxy resin obtained in Example 5.
Figure 4:
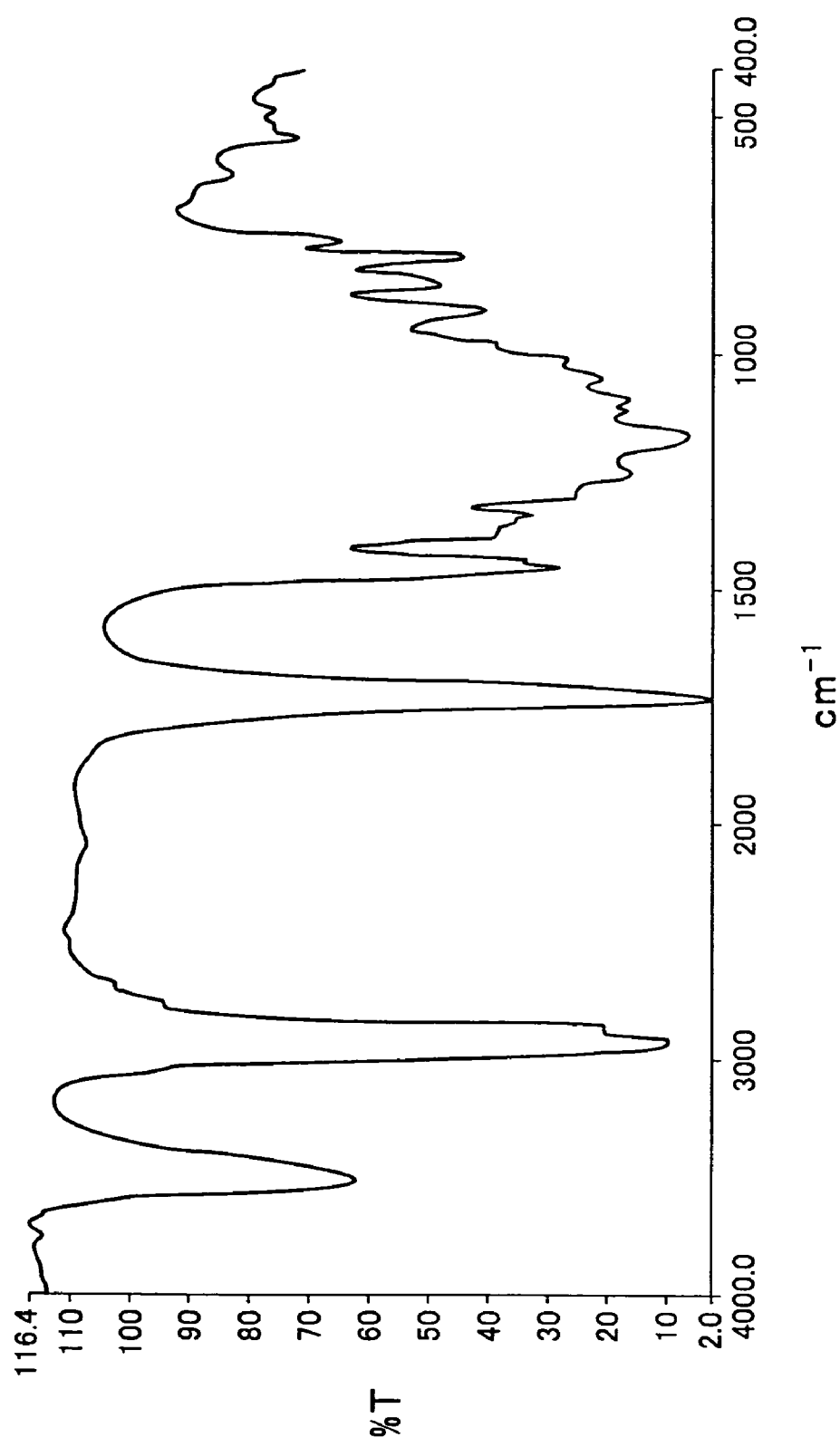
FIG. 4 shows the measuring results of FTIR of the epoxy resin obtained in Example 5.

The same process as Example 1 was carried out except for changing the acid anhydride to 167.5 parts of RIKACID HNA-100 (methylnadic acid anhydride) and changing the epoxy resin to 491.5 parts of CELLOXIDE 2021 and 216.1 parts of ZX-1658 (epoxidized product of cyclohexanedimethanol, primary hydroxyl group equivalent is 1105 g/eq, product of Tohto Kasei Co., Ltd.). The acid anhydride group to primary hydroxyl group ratio was 0.901. The epoxy equivalent of the obtained epoxy resin was 491.5 g/eq and equivalent of primary hydroxyl group was 1734 g/eq. The molar ratio of epoxy group and primary hydroxyl group was 13.11. The molecular weight distribution by GPC is shown in FIG. 3 and measuring result of FTIR is shown in FIG. 4.

Example 6

Figure 5:
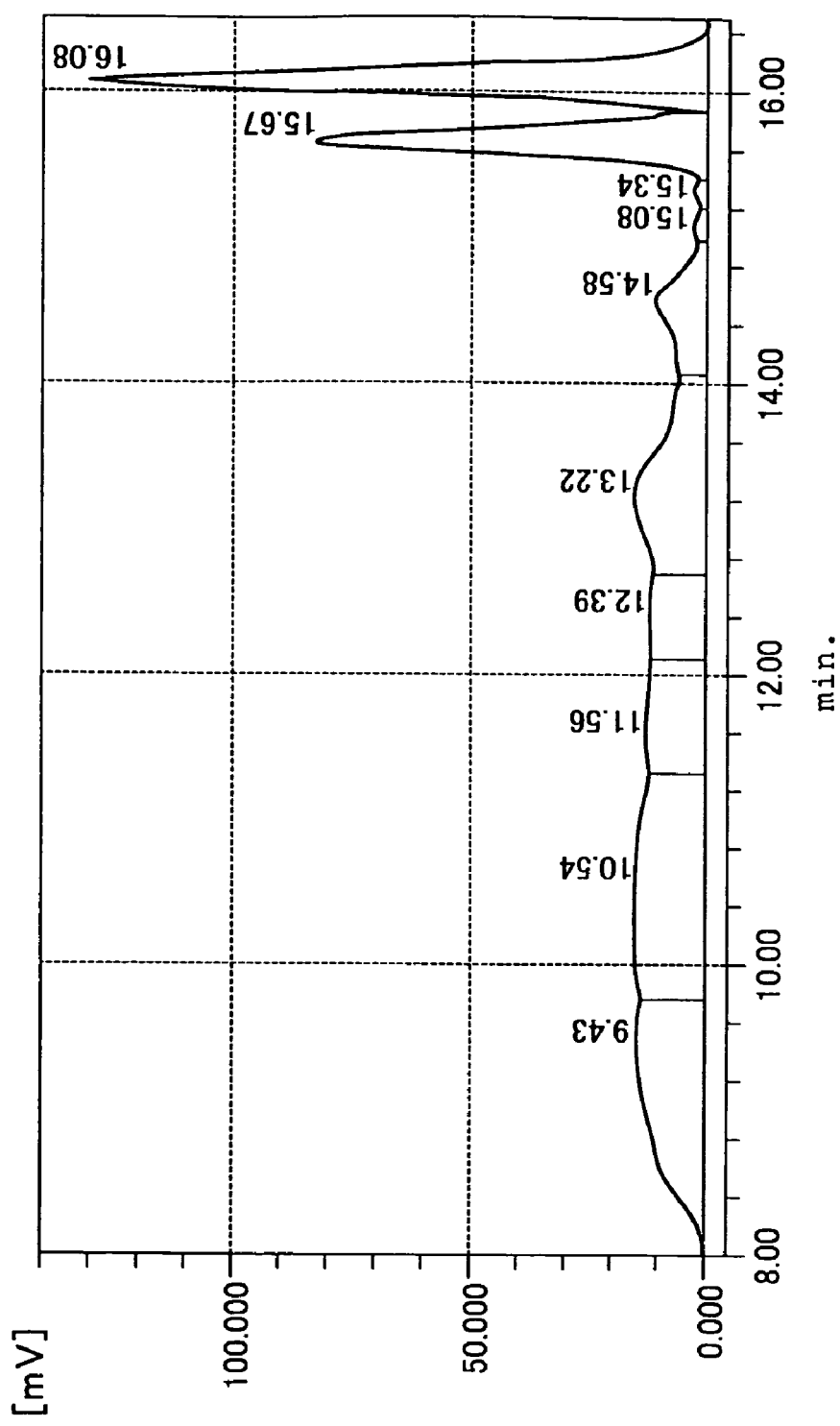
FIG. 5 shows the molecular weight distribution by GPC of the epoxy resin obtained in Example 6.
Figure 6:
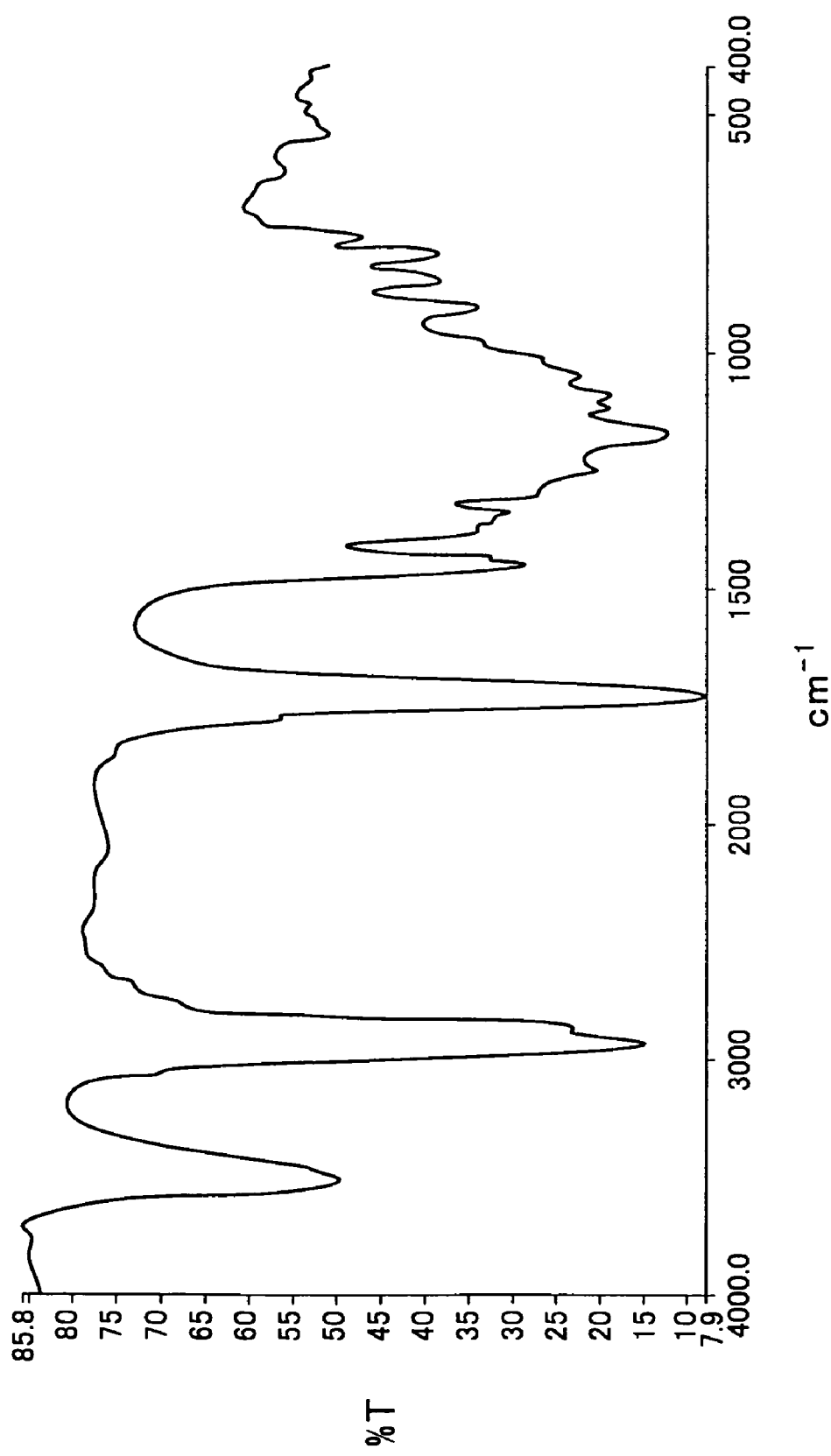
FIG. 6 shows the measuring results of FTIR of an epoxy resin obtained in Example 6.

The same process as Example 1 was carried out except for changing the acid anhydride to 184.0 parts of RIKACID HNA-100 and changing the epoxy resin to 435.7 parts of CELLOXIDE 2021 and 230.9 parts of ZX-1658. The acid anhydride group to primary hydroxyl group ratio was 1.000. The epoxy equivalent of the obtained epoxy resin was 252.6 g/eq and the equivalent of primary hydroxyl group was 4233 g/eq. The molar ratio of epoxy group and primary hydroxyl group was 16.76. The molecular weight distribution by GPC is shown in FIG. 5 and measuring result of FTIR is shown in FIG. 6.

Comparative Example 1

The same process as Example 1 was carried out except for changing the acid anhydride to 100.7 parts of RIKACID MH-700 and changing the epoxy resin to 459.0 parts of HBPA-DGE. The epoxy equivalent of the obtained epoxy resin was 450.7 g/eq and equivalent of primary hydroxyl group was 1482 g/eq. The molar ratio of epoxy group and primary hydroxyl group was 3.29.

Comparative Example 2

The same process as Example 1 was carried out except for changing the acid anhydride to 115.4 parts of RIKACID MH-700 and changing the epoxy resin to 528.8 parts of HBPA-DGE. The epoxy equivalent of the obtained epoxy resin was 435.1 g/eq and equivalent of primary hydroxyl group was 2166 g/eq. The molar ratio of epoxy group and primary hydroxyl group was 4.98.

Comparative Example 3

The same process as Example 1 was carried out except for changing the acid anhydride to 168.0 parts of RIKACID MH-700 and changing the epoxy resin to 699.8 parts of HBPA-DGE. The epoxy equivalent of the obtained epoxy resin was 418.2 g/eq and equivalent of primary hydroxyl group did not exist.

100 parts of the obtained epoxy resins were respectively dissolved in cyclohexanone and 0.5 parts of CYRACURE UVI-6976 (Product of The Dow Chemical Company) was blended as a photo-polymerization initiator. The liquid was coated on a releasing film using a bar coater and the solvent was removed at 150° C. for 30 minutes. Light was irradiated by 10 mW illuminance and 8 J/cm² in an integrated light amount at 365 nm wave length using a Unicure system UVX-01212S1CS01 (product of USHIO INC.), lamp type UVL-1500M2-N1, and further cured at 150° C. for 60 minutes to obtain the cured product.

The cured product was removed from the releasing film and its glass transition point was measured by EXSTAR6200DSC (product of SII Nano Technology Inc.). The measuring condition was as follows. The temperature was programmed from room temperature to 200° C. by 10° C./min temperature-programming speed and the first changing point at $2^{nd}$ cycle was measured as the glass transition point. The results are summarized in Table 1.

The infrared absorption spectrum was measured by 1760X (product of Perkin Elmer Japan Co., Ltd.). The molecular distribution was measured by liquid chromatography HLC-8120 (product of Tosoh Corporation).

As clearly understood from a comparison of Examples 1-3 with Comparative Examples 1-3, the heat resistance of the inventive epoxy resin, which possesses both primary hydroxyl groups and epoxy groups, is improved in a photo-curing method. Further, it is clearly understood that the equivalent ratio of epoxy groups and primary hydroxyl groups is desirably 5 to 50. As shown in Example 6, when an inventive epoxy resin having a primary hydroxyl group and an epoxy group is synthesized by using an epoxy resin having a primary hydroxyl group, the heat resistance is improved too.

Industrial Applicability

Since the epoxy resin of the present invention does not blend polyols, problems of compatibility such as separation or white turbidity caused in a blending process can be eliminated. In an epoxy resin composition of the present invention, problems caused by migration of polyols to the surface and adsorbing humidity in the air, that is, the problem of high moisture absorption, is also removed. Further, since a monomer does not exist, the problem of volatilization does not cause. Since a primary hydroxyl group and epoxy group are existing in one molecule, the crosslinking density of the cured product becomes high and the heat resistance becomes better than that of an epoxy resin to which a polyol is blended.

The invention claimed is:
1. An epoxy resin represented by formula 1, possessing one or more primary hydroxyl groups and one or more epoxy groups in its molecule, formula 1

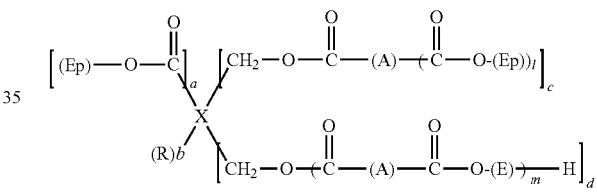

wherein
a is 0 or an integer of 1 or more,
b is 0 or an integer of 1 or more,
c is 0 or an integer of 1 or more,
d is an integer of 1 or more,
  wherein a+c is an integer of 1 or more,
l is an integer of 1 or more,
m is 0 or 1,

TABLE 1

| | Example 1 | Example 2 | Example 3 | Example 4 | Example 5 | Example 6 | Comp. Exp. 1 | Comp. Exp. 2 | Comp. Exp. 1 |
|---|---|---|---|---|---|---|---|---|---|
| pentaerythritol | 34.0 | 34.0 | 34.0 | 34.0 | 34.0 | 34.0 | 34.0 | 34.0 | 34.0 |
| methylhexahydrophthalic acid anhydride | 134.3 | 151.0 | 159.6 | 100.7 | | | 100.7 | 115.4 | 168.0 |
| methylnadic acid anhydride | | | | | 165.7 | 184.0 | | | |
| toluene | 30.0 | | 34.2 | 15.0 | 35.2 | 38.5 | 23.8 | 26.4 | 35.6 |
| acid anhydride group to primary hydroxyl group | 0.799 | 0.899 | 0.950 | 0.599 | 0.901 | 1.000 | 0.599 | 0.687 | 1.000 |
| HBPA-DGE | 617.4 | 753.1 | 667.0 | 280.0 | | | 459.0 | 528.8 | 699.8 |
| CELLOXIDE 2021 | | | | 280.0 | 491.5 | 435.7 | | | |
| ZX-1658 | | | | | 216.1 | 230.9 | | | |
| epoxy equivalent | 420.8 | 381.9 | 408.9 | 273.5 | 234.5 | 252.6 | 450.7 | 435.1 | 418.2 |
| primary hydroxyl group equivalent | 3917 | 9271 | 17212 | 1734 | 3075 | 4233 | 1482 | 2166 | — |
| epoxy group to primary hydroxyl group | 9.31 | 24.28 | 42.09 | 6.34 | 13.11 | 16.76 | 3.29 | 4.98 | — |
| DSC Tg (° C.) | 94.1 | 94.7 | 92.8 | 131.1 | 160.6 | 156.6 | 87.8 | 90.5 | 90.6 |

(Ep) is a reaction residue of an epoxy resin and is specifically represented by formulae 2 and 3, (E) is a reaction residue of an epoxy resin and is specifically represented by formulae 4 and 5, (X) is a carbon atom or a hydrocarbon group which can contain a nitrogen atom, phosphorus atom, oxygen atom or sulfur atom, (A) is a hydrocarbon group of an acid anhydride residue and can contain a nitrogen atom, phosphorus atom, oxygen atom or sulfur atom, R is a hydrogen atom or a hydrocarbon group which can contain a nitrogen atom, phosphorus atom, oxygen atom or sulfur atom,

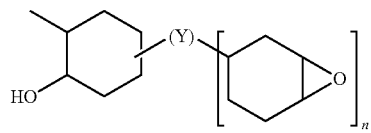

formula 2 wherein n is an integer of 1 or more,

Y is a hydrocarbon group and can contain a nitrogen atom, phosphorus atom, oxygen atom or sulfur atom and, further, can have a linear, branch, ring, aromatic ring or heterocyclic structure,

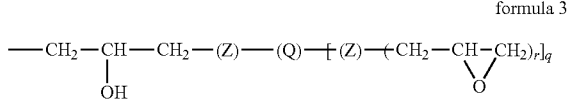

formula 3 wherein q is an integer of 1 or more, r is 1 or 2,

Q is a hydrocarbon group and can contain a nitrogen atom, phosphorus atom, oxygen atom or sulfur atom and, further, can have a linear, branch, ring, aromatic ring or heterocyclic structure, Z indicates —O—, —COO— or —N=,

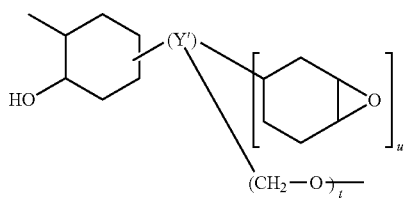

formula 4 wherein u is 0 or an integer of 1 or more, t is an integer of 1 or more,

Y' is a hydrocarbon group and can contain a nitrogen atom, phosphorus atom, oxygen atom or sulfur atom and, further, can have a linear, branch, ring, aromatic ring or heterocyclic structure,

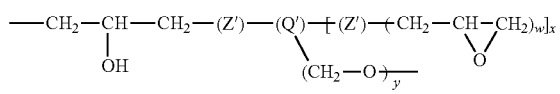

formula 5 wherein w is 1 or 2, x is 0 or an integer of 1 or more, y is an integer of 1 or more, Q' is a hydrocarbon group and can contain a nitrogen atom, phosphorus atom, oxygen atom or sulfur atom and, further, can have a linear, branch, ring, aromatic ring or heterocyclic structure and Z' indicates —O—, —COO— or —N=.

2. The epoxy resin of claim 1 obtained by reacting an epoxy resin with a compound possessing one or more primary hydroxyl groups and one or more carboxyl or carboxylic acid groups in one molecule.

3. The epoxy resin of claim 2, wherein the compound possessing one or more primary hydroxyl groups and one or more carboxyl or carboxylic acid groups is obtained by reacting an alcohol possessing one or more primary hydroxyl groups in its molecule and a carboxylic acid anhydride.

4. The epoxy resin of claim 3, wherein the compound possessing one or more primary hydroxyl groups and one or more carboxyl or carboxylic acid groups is obtained by reacting an alcohol possessing two or more primary hydroxyl groups in its molecule with a carboxylic acid anhydride.

5. The epoxy resin of claim 4, wherein the acid anhydride equivalent to one equivalent of primary hydroxyl group is less than one equivalent.

6. The epoxy resin of claim 1 obtained by reacting an epoxy resin possessing one or more than one primary hydroxyl group and one or more than one epoxy group in its molecule with a compound possessing two or more than two carboxyl group.

7. An epoxy resin composition containing an epoxy resin according to claim 1 as an essential component, wherein the equivalent ratio of epoxy group to 1 equivalent of primary hydroxyl group in said composition is 5 to 50.

8. The epoxy resin composition of claim 7 comprising a photo-polymerization initiator as a curing agent.

9. A cured product prepared by heat-curing or photo-curing of the epoxy resin composition of claim 7.

10. A method of preparing an epoxy resin represented by formula (I), possessing one or more primary hydroxyl groups and one or more epoxy groups in its molecule,

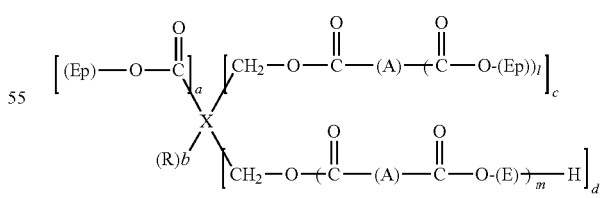

formula 1 wherein a is 0 or an integer of 1 or more, b is 0 or an integer of 1 or more, c is 0 or an integer of 1 or more, d is an integer of 1 or more, wherein a+c is an integer of 1 or more, l is an integer of 1 or more, m is 0 or 1, (Ep) is a reaction residue of an epoxy resin and is specifically represented by formulae 2 and 3, (E) is a reaction residue of an epoxy resin and is specifically represented by formulae 4 and 5, (X) is a carbon atom or a hydrocarbon group which can contain a nitrogen atom, phosphorus atom, oxygen atom or sulfur atom, (A) is a hydrocarbon group of an acid anhydride residue and can contain a nitrogen atom, phosphorus atom, oxygen atom or sulfur atom, R is a hydrogen atom or a hydrocarbon group which can contain a nitrogen atom, phosphorus atom, oxygen atom or sulfur atom,

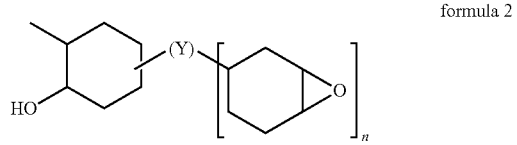

formula 2 wherein $n$ is an integer of 1 or more,

Y is a hydrocarbon group and can contain a nitrogen atom, phosphorus atom, oxygen atom or sulfur atom and, further, can have a linear, branch, ring, aromatic ring or heterocyclic structure,

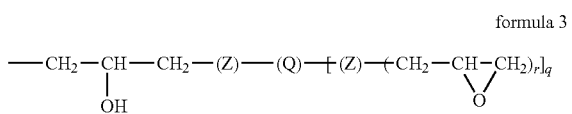

formula 3 wherein $q$ is an integer of 1 or more, $r$ is 1 or 2,

Q is a hydrocarbon group and can contain a nitrogen atom, phosphorus atom, oxygen atom or sulfur atom and, further, can have a linear, branch, ring, aromatic ring or heterocyclic structure, Z indicates —O—, —COO— or —N=,

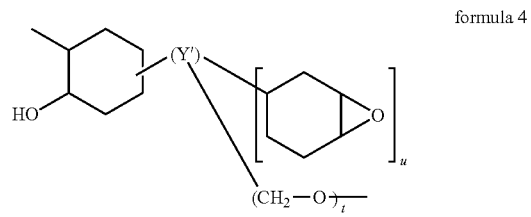

formula 4 wherein $u$ is 0 or an integer of 1 or more, $t$ is an integer of 1 or more,

Y' is a hydrocarbon group and can contain a nitrogen atom, phosphorus atom, oxygen atom or sulfur atom and, further, can have a linear, branch, ring, aromatic ring or heterocyclic structure,

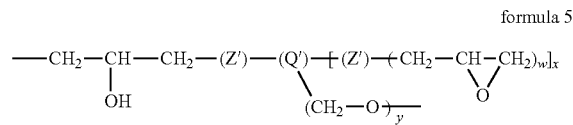

formula 5 wherein $w$ is 1 or 2, $x$ is 0 or an integer of 1 or more, $y$ is an integer of 1 or more, Q' is a hydrocarbon group and can contain a nitrogen atom, phosphorus atom, oxygen atom or sulfur atom and, further, can have a linear, branch, ring, aromatic ring or heterocyclic structure and Z' indicates —O—, —COO— or —N=, comprising the step of reacting an epoxy resin with a compound containing one or more primary hydroxyl groups and one or more carboxyl or carboxylic acid groups in its molecule.

11. The method of claim 10, wherein the compound containing one or more primary hydroxyl groups and one or more carboxyl or carboxylic acid groups in one molecule is prepared by reacting an alcohol with one or more primary hydroxyl groups in its molecule with a carboxylic acid anhydride.

* * * * *